United States Patent Office 2,939,872
Patented June 7, 1960

2,939,872

ETHYL 3-(2,4-DICHLOROPHENYL) GLYCIDATE

Robert L. Hudson, Midland, Mich., assignor to The Dow Chemical Company, Midland, Mich., a corporation of Delaware No Drawing. Filed Oct. 29, 1958, Ser. No. 770,317

1 Claim. (Cl. 260—348)

The present invention is directed to the novel compound, ethyl 3-(2,4-dichlorophenyl) glycidate and to a method for preparing the same. The novel compound corresponds to the formula

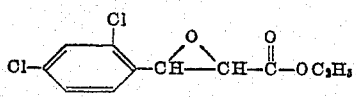

The compound is a colorless liquid under ordinary conditions, soluble in many common organic solvents such as diethyl ether, acetone, and lower alkanols, and of low solubility in water. It is useful as a fungicide, miticide, insecticide and herbicide.

The present compound may be prepared by contacting together 2,4-dichlorobenzaldehyde and ethyl chloroacetate, in the presence of an alkali metal methoxide which may be sodium methoxide. Conveniently, the reaction is carried out in an inert liquid reaction medium, which may be anhydrous diethyl ether. Good results are obtained when approximately equimolecular amounts are employed of the aldehyde, the chloroacetate and the methoxide. The process is somewhat exothermic, and takes place smoothly at temperatures of from approximately 0° C. to approximately 30° C., with production of the present compound together with alkali metal chloride and methanol.

In carrying out the reaction, the 2,4-dichlorobenzaldehyde, ethyl chloroacetate, and alkali metal methoxide are intimately mixed and blended together in the liquid reaction medium. Preferably, the combining of the reactants is carried out at a temperature in the range of 0° C. to 15° C. The temperature of the resulting reaction mixture may be controlled by regulating the rate of contacting the reactants or by external cooling, or both. Upon completion of the combining of the reactants, the temperature of the reaction mixture is allowed to rise slowly to, and thereafter is maintained for a period of time at room temperature, with continuous stirring, to carry the reaction to completion. Upon completion of the reaction, the desired product may be separated in known manners. In one such separation, the reaction mixture is washed with dilute acetic acid and extracted with ether. The ether extract is warmed to vaporize and remove solvent, and the resulting liquid residue distilled under subatmospheric pressure to obtain the desired product.

The following example illustrates the invention but is not to be considered as limiting it.

*Example 1*

Sodium methoxide (54 grams; 1.0 mole) was added slowly, portionwise, and with continuous stirring to a solution of 175 grams (1.0 mole) of 2,4-dichlorobenzaldehyde and 136.5 grams (1.1 mole) of ethyl chloroacetate, in 300 milliliters of absolute diethyl ether. The resulting reaction mixture was externally cooled, and the rate of combining of the sodium methoxide with the other reactants was so regulated as to maintain the reaction mixture at a temperature of between 10° and 15° C. during the period of the combining of the reactants. Thereafter, with continuous stirring, the reaction mixture was allowed to rise to room temperature and was maintained thereat for 12 hours, to carry the reaction to completion. At the end of the reaction time, the reaction mixture was shaken with a large excess volume of dilute acetic acid and extracted therefrom with diethyl ether. The ether solution of product was warmed under reduced pressure to vaporize and remove solvent, and the resulting liquid residue was then distilled under decreasing pressure and increasing temperature to obtain ethyl 3-(2,4-dichlorophenyl)glycidate as a colorless liquid boiling at 110°-120° C. under 0.2 millimeter pressure.

The present compound is useful as a fungicide, and is especially adapted to be employed in the control of arachnid mites parasitic upon desired plants. In a representative operation, the application to a population of young bean plants heavily infested with 2-spotted spider mites of an aqueous dispersion containing the present compound in a concentration corresponding to 1 pound by weight to 100 gallons by volume gave 100 percent control of the mites; whereas a similar infested population of bean plants treated identically except that the present compound was omitted remained heavily infested.

Various modifications of the process and products of the present invention may be made without departing from the spirit or scope thereof, and it is to be understood that I limit myself only as defined in the appended claim.

I claim:
Ethyl 3-(2,4-dichlorophenyl) glycidate.

References Cited in the file of this patent

UNITED STATES PATENTS

| | | |
|---|---|---|
| 1,899,340 | Knorr et al. | Feb. 28, 1933 |
| 2,432,118 | Mullen et al. | Dec. 9, 1947 |

OTHER REFERENCES

Newman et al.: Organic Reactions, vol. 5 (1949), pp. 413-440.